United States Patent
Luo et al.

(10) Patent No.: US 11,126,429 B2
(45) Date of Patent: *Sep. 21, 2021

(54) APPARATUS AND METHODS FOR BITWISE VECTOR OPERATIONS

(71) Applicant: Cambricon Technologies Corporation Limited, Beijing (CN)

(72) Inventors: Tao Luo, Beijing (CN); Tian Zhi, Beijing (CN); Shaoli Liu, Beijing (CN); Tianshi Chen, Beijing (CN); Yunji Chen, Beijing (CN)

(73) Assignee: Cambricon Technologies Corporation Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,148

(22) Filed: Jan. 17, 2019

(65) Prior Publication Data

US 2019/0171454 A1    Jun. 6, 2019

Related U.S. Application Data

(63) Continuation of application No. 16/171,987, filed on Oct. 26, 2018, now abandoned, and a continuation-in-part of application No. PCT/CN2016/081525, filed on May 10, 2016.

(30) Foreign Application Priority Data

Apr. 26, 2016  (CN) .......................... 201610267024.2

(51) Int. Cl.
*G06F 9/30* (2018.01)
*G06N 3/02* (2006.01)

(52) U.S. Cl.
CPC ........ *G06F 9/30036* (2013.01); *G06F 9/3004* (2013.01); *G06F 9/30029* (2013.01); *G06N 3/02* (2013.01)

(58) Field of Classification Search
CPC . G06F 9/30036; G06F 9/30029; G06F 9/3004
See application file for complete search history.

(56) References Cited

U.S. PATENT DOCUMENTS

| 5,838,984 A | 11/1998 | Nguyen et al. |
| 2008/0244193 A1* | 10/2008 | Sistla .................. G06F 12/0835 711/146 |

(Continued)

FOREIGN PATENT DOCUMENTS

| CN | 102156637 A | 8/2011 |
| CN | 102262525 A | 11/2011 |

(Continued)

OTHER PUBLICATIONS

T. Chen, et al., "A Small-Footprint Accelerator for Large-Scale Neural Networks", ACM Transactions on Computer Systems, vol. 33, No. 2, Article 6, May 2015, 27 pages.

(Continued)

*Primary Examiner* — William B Partridge
(74) *Attorney, Agent, or Firm* — Getech Law LLC; Jun Ye

(57) ABSTRACT

Aspects for vector operations in neural network are described herein. The aspects may include a vector caching unit configured to store a first vector and a second vector, wherein the first vector includes one or more first elements and the second vector includes one or more second elements. The aspects may further include a computation module that includes one or more bitwise processors and a combiner. The bitwise processors may be configured to perform bitwise operations between each of the first elements and a corresponding one of the second elements to generate one or more operation results. The combiner may be configured to combine the one or more operation results into an output vector.

16 Claims, 6 Drawing Sheets

(56) References Cited

U.S. PATENT DOCUMENTS

| | | | | |
|---|---|---|---|---|
| 2012/0137090 A1* | 5/2012 | Biswas | ............... | G06F 12/0638 |
| | | | | 711/157 |
| 2015/0100755 A1* | 4/2015 | Reid | ....................... | G06F 15/78 |
| | | | | 712/7 |
| 2016/0098200 A1* | 4/2016 | Guz | ........................ | G06F 11/30 |
| | | | | 711/154 |

FOREIGN PATENT DOCUMENTS

| | | |
|---|---|---|
| CN | 105487812 A | 4/2016 |
| WO | 2013058695 A1 | 4/2013 |
| WO | 2015052485 A1 | 4/2015 |
| WO | WO 2017/185404 A1 | 11/2017 |

OTHER PUBLICATIONS

Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
201610267024.2—Office Action, dated May 20, 2019, 8 pages. (no English translation).
PCT/CN2016/081525—International Search Report, dated Jan. 25, 2017, 9 pages. (no English translation).
EP 16899915.9, European Examination Report dated May 14, 2020, 4 pages.
CN201610267024.2, Official Action dated Jan. 6, 2020, 8 Pages (No English Translation).
EP 16899915.9—European Search Report, dated Mar. 3, 2020, 4 pages.
EP 16899915.9—Rule 70b(1), mailed Mar. 10, 2020, 1 page.

\* cited by examiner

APPARATUS AND METHODS FOR BITWISE VECTOR OPERATIONS

CROSS-REFERENCE TO RELATED APPLICATIONS

The present invention is a continuation of U.S. application Ser. No. 16/171,987, filed on Oct. 26, 2018, which is a continuation-in-part of PCT Application No. PCT/CN2016/081525, filed on May 10, 2016, which claims priority to commonly owned CN application number 201610267024.2, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. More specifically, logical operations for vectors may be performed frequently in deep learning processes in MMNs.

A known method to perform logical operations for vectors in a multilayer artificial neural network is to use a general-purpose processor. However, one of the defects of the method is low performance of a single general-purpose processor which cannot meet performance requirements for usual multilayer neural network operations with respect to a vector with a large number of elements.

Another known method to perform logical operations for vectors of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then data of the vector elements may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for vector operations in a neural network. The example apparatus may include a vector caching unit configured to store a first vector and a second vector, wherein the first vector includes one or more first elements and the second vector includes one or more second elements. The example apparatus may further include a computation module that includes one or more bitwise processors and a combiner. The bitwise processors may be configured to perform bitwise operations between each of the first elements and a corresponding one of the second elements to generate one or more operation results. The combiner may be configured to combine the one or more operation results into an output vector.

Another example apparatus may include a vector caching unit configured to store a vector that includes one or more elements. The example apparatus may further include a computation module that includes one or more bitwise processors configured to perform bitwise operations to the one or more elements to generate an output result.

The example aspect of the present disclosure provides an example method for vector operations in a neural network. The example method may include storing, by a vector caching unit, a first vector and a second vector, wherein the first vector includes one or more first elements and the second vector includes one or more second elements; performing, by one or more bitwise processors of a computation module, bitwise operations between each of the first elements and a corresponding one of the second elements to generate one or more operation results; and combining, by a combiner of the computation module, the one or more operation results into an output vector.

Another example method may include storing, by a vector caching unit, a vector that includes one or more elements; and performing, by one or more bitwise processors of a computation module, bitwise operations to the one or more elements to generate an output result.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Various types of vector operations may be performed in a neural network. A vector may refer to one or more values formatted in a one-dimensional data structure. The values included in a vector may be referred to as elements. The number of the elements in the vector may be referred to as a length of the vector. For example, the vector operations may include a logical AND between two vectors, a logical OR between two vectors, a logical AND for the elements in a vector, and a logical OR for the elements in a vector.

Figure 1:
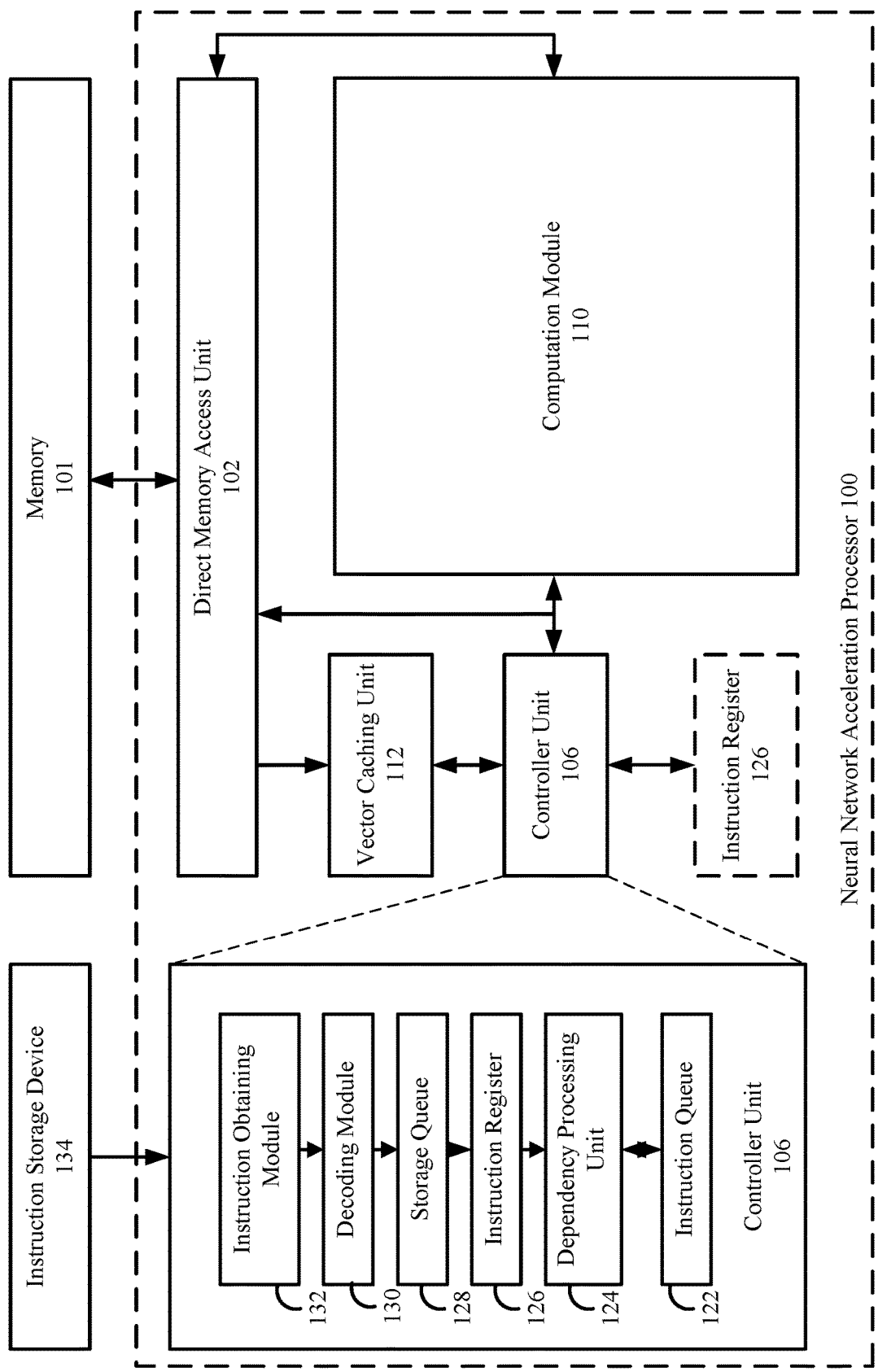
FIG. 1 illustrates a block diagram of an example neural network acceleration processor by which vector operations may be implemented in a neural network.

FIG. 1 illustrates a block diagram of an example neural network acceleration processor by which vector operations may be implemented in a neural network. As depicted, the example neural network acceleration processor 100 may include an instruction caching unit 104, a controller unit 106, a direct memory access unit 102, a computation module 110, and a vector caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a vector bitwise operation instruction may originate from an instruction storage device 134 to the controller unit 106. An instruction obtaining module 132 may be configured to obtain a vector bitwise operation instruction from the instruction storage device 134 and transmit the instruction to a decoding module 130.

The decoding module 130 may be configured to decode the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addresses in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in a vector-AND instruction, for example, may include a starting address of a vector, a length of the vector, and an address for an output result. As depicted, in some examples, the instruction register 126 may be implemented by one or more registers external to the controller unit 106.

Once the relevant values are retrieved, the instruction may be sent to a dependency processing unit 124. The dependency processing unit 124 may be configured to determine whether the vector bitwise operation instruction has a dependency relationship with the data of the previous instruction that is being executed. This vector bitwise operation instruction may be stored in the storage queue module 122 until it has no dependency relationship on the data with the previous instruction that has not finished executing. If the dependency relationship does not exist, the controller unit 106 may be configured to decode the vector bitwise operation into micro-instructions for controlling operations of other modules including the direct memory access unit 102 and the computation module 110.

For example, the controller unit 106 may receive a vector-AND-vector (VAV) instruction that includes a starting address of a first vector, a length of the first vector, a starting address of a second vector, a length of the second vector, and an address for an output vector. According to the VAV instruction, the direct memory access unit 102 may be configured to retrieve the first vector and the second vector from the memory 101 according to the respective addresses included in the VAV instruction. The retrieved vectors may be transmitted to and stored in the vector caching unit 112.

In some examples, the controller unit 106 may receive a vector-AND (VAND) instruction that includes a starting address of a vector, a length of the vector, and an address for an output result. According to the VAND instruction, the direct memory access unit 102 may be configured to retrieve the vector from the memory 101 according to the address. The vector may be transmitted to and stored in the vector caching unit 112.

In some examples, the controller unit 106 may receive a vector-OR-vector (VOV) instruction that includes a starting address of a first vector, a length of the first vector, a starting address of a second vector, a length of the second vector, and an address for an output vector. According to the VOV instruction, the direct memory access unit 102 may be configured to retrieve the first vector and the second vector from the memory 101 according to the respective addresses included in the VOV instruction. The retrieved vectors may be transmitted to and stored in the vector caching unit 112.

In some examples, the controller unit 106 may receive a vector-OR (VOR) instruction that includes a starting address of a vector, a length of the vector, and an address for an output result. According to the VOR instruction, the direct memory access unit 102 may be configured to retrieve the vector from the memory 101 according to the address. The vector may be transmitted to and stored in the vector caching unit 112.

The above mentioned instructions may be formatted as follows and may be stored in the instruction caching unit 104:

|  | Register 0 | Register 1 | Register 2 | Register 3 | Register 4 |
| --- | --- | --- | --- | --- | --- |
| VAV | Starting address of the first vector | Length of the first vector | Starting address of the second vector | Length of the second vector | Address for output vector |
| VAND | Starting address of a vector | Length of the vector | Output result | | |
| VOV | Starting address of the first vector | Length of the first vector | Starting address of the second vector | Length of the second vector | Address for output vector |
| VOR | Starting address of a vector | Length of the vector | Output result | | |

Hereinafter, a caching unit (e.g., the vector caching unit 112 etc.) may refer to an on-chip caching unit integrated in the neural network acceleration processor 100, rather than other storage devices in memory 101 or other external devices. In some examples, the on-chip caching unit may be implemented as a register file, an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

Figure 2A:
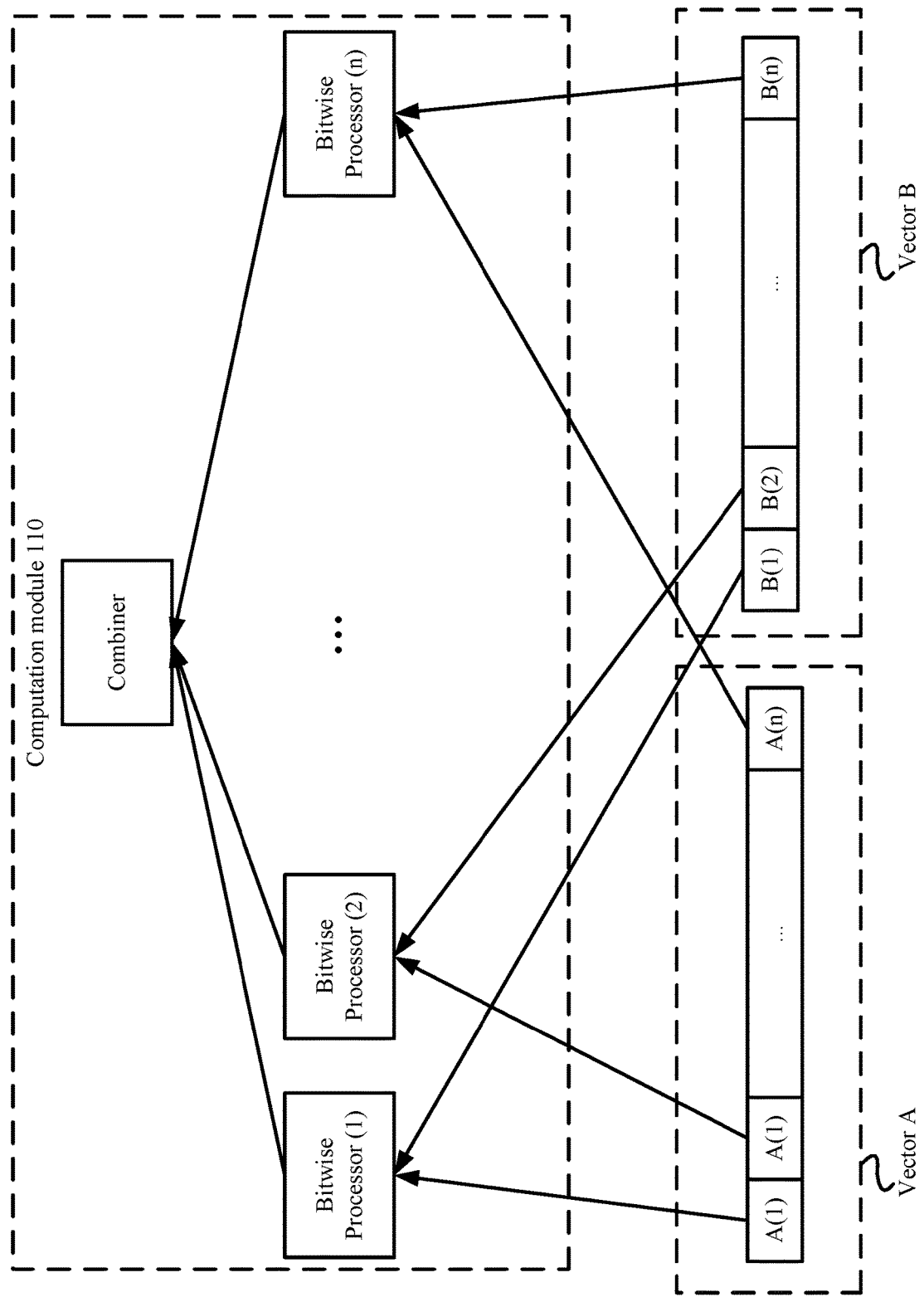
FIG. 2A illustrates an example logical operation process between two vectors that may be performed by the example neural network acceleration processor.

FIG. 2A illustrates an example logical operation process between two vectors that may be performed by the example neural network acceleration processor.

As depicted, a first vector ("Vector A") may include one or more elements respectively denoted as A(1), A(2), . . . A(n) and, similarly, a second vector ("Vector B") may include one or more elements respectively denoted as B(1), B(2), . . . B(n). The elements in the first vector may be referred to as first elements. The elements in the second vector may be referred to as second elements.

The computation module 110 may include one or more bitwise processors and a combiner. In response to a VAV instruction, each of the bitwise processors may be configured to perform a bitwise AND operation between a first element in the first vector to a corresponding second element in the second vector e.g., A(1) AND B(1), A(2) AND B(2), . . . A(n) AND B(n). A bitwise AND operation may refer to an operation between two values that only yields a value of "1" if both the two values are 1. The operation results generated respectively by the bitwise processors may be directly transmitted to a combiner. In other words, the operation results may be transmitted to the combiner without being temporarily stored in the vector caching unit 112. The combiner may be configured to combine the operation results to generate an output vector. The output vector may be represented as A(1) AND B(1), A(2) AND B(2), . . . A(n) AND B(n).

In response to a VOV instruction, each of the bitwise processors may be configured to perform a bitwise OR operation between a first element in the first vector to a corresponding second element in the second vector e.g., A(1) OR B(1), A(2) OR B(2), . . . A(n) OR B(n). A bitwise OR operation may refer to an operation between two values that yields a value of "1" if either the two values is 1. The operation results generated respectively by the bitwise processors may be directly transmitted to a combiner without being temporarily stored in the vector caching unit 112. The combiner may be configured to combine the operation results to generate an output vector. The output vector may be represented as A(1) OR B(1), A(2) OR B(2), . . . A(n) OR B(n).

Figure 2B:
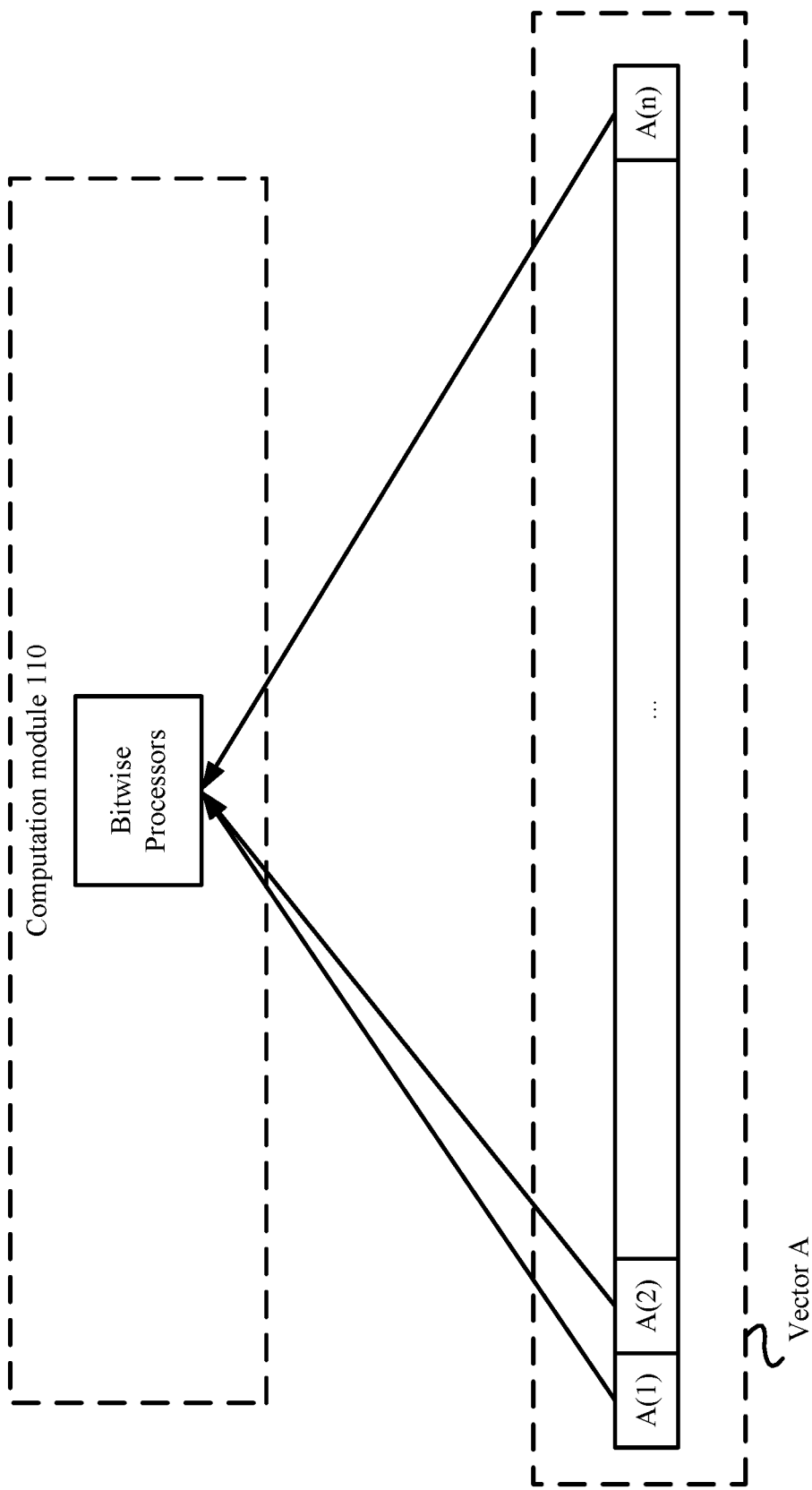
FIG. 2B illustrates an example logical operation process that may be performed by the example neural network acceleration processor.

FIG. 2B illustrates an example logical operation process that may be performed by the example neural network acceleration processor.

As depicted, the computation module 110 may be configured to perform logical operation to a vector ("Vector A"). The vector may include one or more elements respectively denoted as A(1), A(2), . . . A(n).

The computation module 110 may include one or more bitwise processors. In response to a VAND instruction, the one or more bitwise processors may be configured to perform a bitwise AND operation for all the elements in the vector to generate an output result. In other words, the output result is a value of 1 only when all the elements in the vector are 1.

In response to a VOR instruction, the one or more bitwise processors may be configured to perform a bitwise OR operation for all the elements in the vector to generate an output result. In other words, the output result is a value of 1 when at least one of the elements in the vectors is 1.

Figure 3:
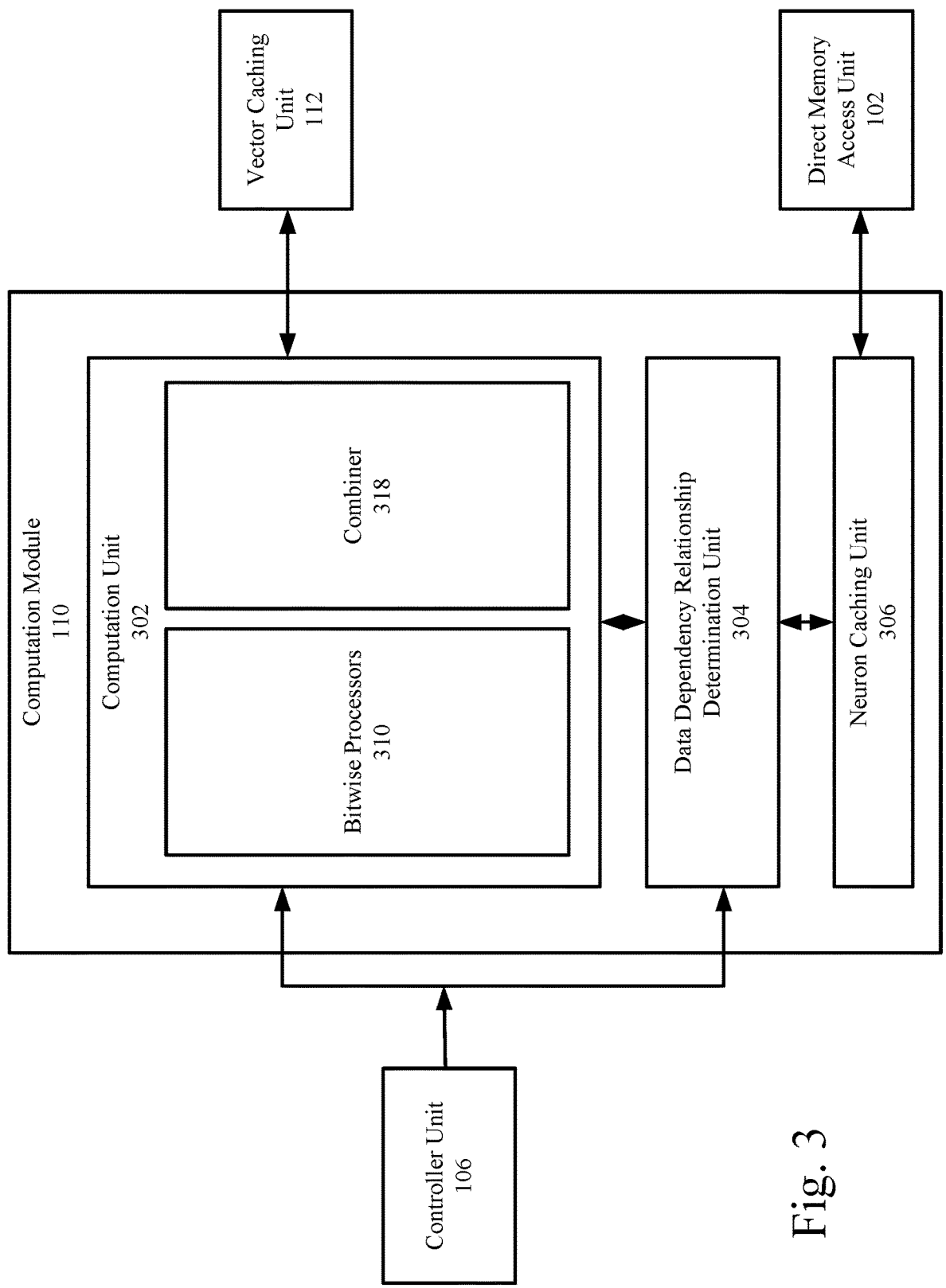
FIG. 3 illustrates an example computation module in the example neural network acceleration processor by which vector operations may be implemented in a neural network.

FIG. 3 illustrates an example computation module 110 in the example neural network acceleration processor by which vector operations may be implemented in a neural network.

As depicted, the computation module 110 may include a computation unit 302, a data dependency relationship determination unit 304, a neuron caching unit 306. The computation unit 302 may further include one or more bitwise processors 310 and a combiner 318.

The data dependency relationship determination unit 304 may be configured to perform data access operations (e.g., reading or writing operations) on the caching units including the neuron caching unit 306 during the computation process. The data dependency relationship determination unit 304 may be configured to prevent conflicts in reading and writing of the data in the caching units. For example, the data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 304 may be stored in an instruction queue within the data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 306 may be configured to store the elements in the first vector and the second vector.

The computation unit 302 may be configured to receive the micro-instructions decoded from the vector operation instruction from the controller unit 106. In the example that the computation unit 302 receives micro-instructions decoded from a VAV instruction, each of the bitwise processors 310 may be configured to perform a bitwise AND operation between a first element in the first vector to a corresponding second element in the second vector e.g., A(1) AND B(1), A(2) AND B(2), . . . A(n) AND B(n). The operation results generated respectively by the bitwise processors 310 may be directly transmitted to the combiner 318. In other words, the operation results may be transmitted to the combiner without being temporarily stored in the vector caching unit 112. The combiner 318 may be configured to combine the operation results to generate an output vector. The output vector may be represented as A(1) AND B(1), A(2) AND B(2), . . . A(n) AND B(n).

In response to a VOV instruction, each of the bitwise processors 310 may be configured to perform a bitwise OR operation between a first element in the first vector to a corresponding second element in the second vector e.g., A(1) OR B(1), A(2) OR B(2), . . . A(n) OR B(n). A bitwise OR operation may refer to an operation between two values that yields a value of "1" if either the two values is 1. The operation results generated respectively by the bitwise processors 310 may be directly transmitted to the combiner 318 without being temporarily stored in the vector caching unit 112. The combiner 318 may be configured to combine the operation results to generate an output vector. The output vector may be represented as A(1) OR B(1), A(2) OR B(2), . . . A(n) OR B(n).

In response to a VAND instruction, the one or more bitwise processors 310 may be configured to perform a bitwise AND operation for all the elements in a single vector to generate an output result, e.g., A(1) AND A(2) AND A(3) . . . AND A(n). In other words, the output result is a value of 1 only when all the elements in the vector are 1.

In response to a VOR instruction, the one or more bitwise processors 310 may be configured to perform a bitwise OR operation for all the elements in the vector to generate an output result e.g., A(1) OR A(2) OR A(3) . . . OR A(n). In other words, the output result is a value of 1 when at least one of the elements in the vectors is 1.

Figure 4:
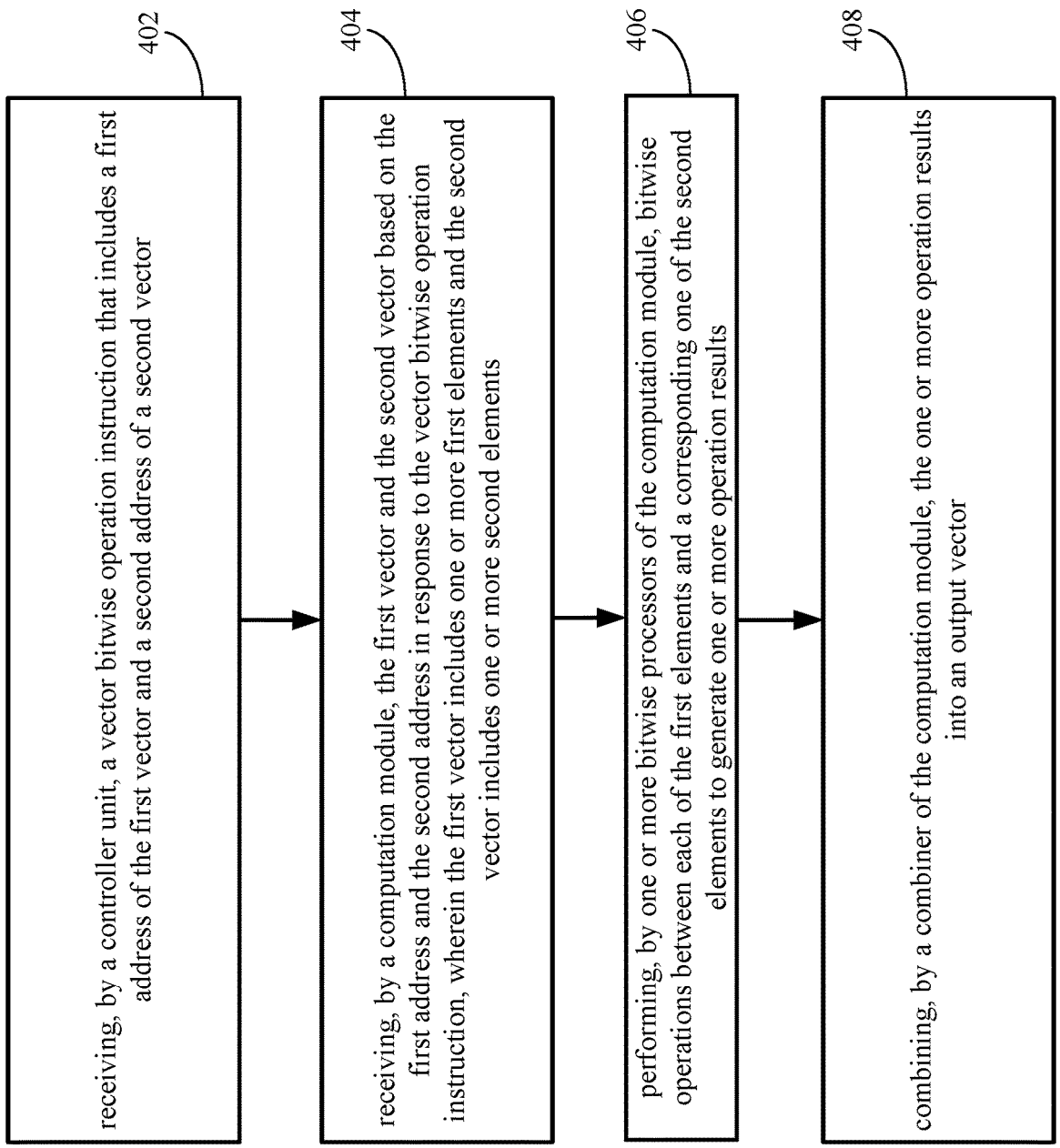
FIG. 4 illustrates a flow chart of an example method for performing logical operations between two vectors in a neural network.

FIG. 4 illustrates a flow chart of an example method 400 for performing logical operations between two vectors in a neural network. The method 400 may be performed by one or more components the apparatus of FIGS. 1 and 3.

At block 402, the example method 400 may include receiving, by a controller unit, a vector bitwise operation instruction that includes a first address of the first vector and a second address of a second vector. For example, the controller unit 106 may be configured to receive a vector bitwise operation instruction that includes a first address of the first vector and a second address of a second vector.

At block 404, the example method 400 may include receiving, by a computation module, the first vector and the second vector based on the first address and the second address in response to the vector bitwise operation instruction, wherein the first vector includes one or more first elements and the second vector includes one or more second elements. For example, the computation module 110 may receive a first vector that may include one or more elements respectively denoted as A(1), A(2), . . . A(n) and, similarly, a second vector that may include one or more elements respectively denoted as B(1), B(2), . . . B(n).

At block 406, the example method 400 may include performing, by one or more bitwise processors of the computation module, bitwise operations between each of the first elements and a corresponding one of the second elements to generate one or more operation results. In the example that the computation unit 302 receives micro-instructions decoded from a VAV instruction, each of the bitwise processors 310 may be configured to perform a bitwise AND operation between a first element in the first vector to a corresponding second element in the second vector e.g., A(1) AND B(1), A(2) AND B(2), . . . A(n) AND B(n). In response to a VOV instruction, each of the bitwise processors 310 may be configured to perform a bitwise OR operation between a first element in the first vector to a corresponding second element in the second vector e.g., A(1) OR B(1), A(2) OR B(2), . . . A(n) OR B(n).

At block 406, the example method 400 may include combining, by a combiner of the computation module, the one or more operation results into an output vector. For example, the operation results generated respectively by the bitwise processors 310 may be directly transmitted to the combiner 318 without being temporarily stored in the vector caching unit 112. The combiner 318 may be configured to combine the operation results to generate an output vector.

Figure 5:
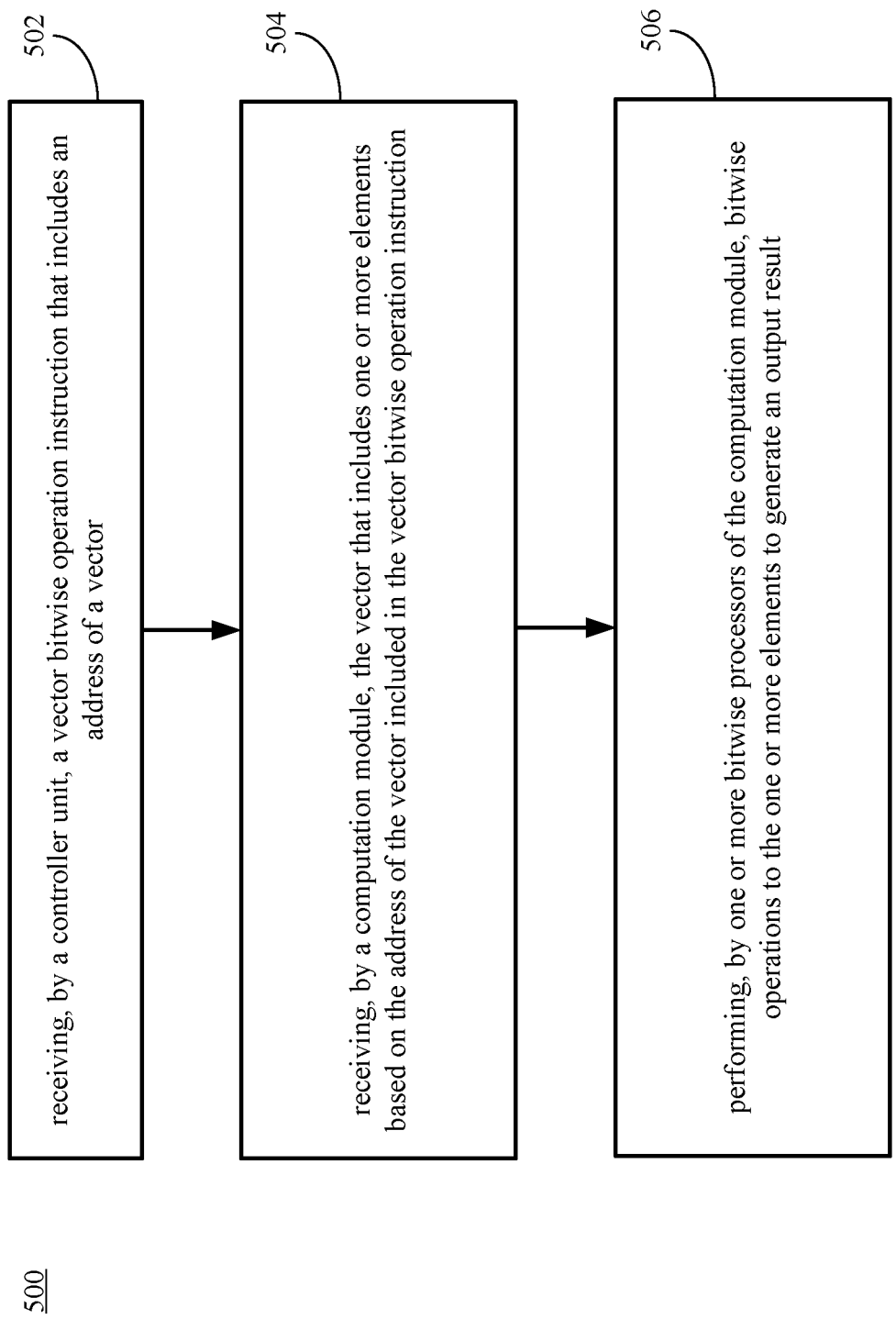
FIG. 5 illustrates a flow chart of an example method for performing logical operation for a vector in a neural network.

FIG. 5 illustrates a flow chart of an example method 500 for performing logical operation for a vector in a neural network. The method 500 may be performed by one or more components the apparatus of FIGS. 1 and 3.

At block 502, the example method 500 may include receiving, by a controller unit, a vector bitwise operation instruction that includes an address of a vector. For example, the controller unit 106 may receive a vector bitwise operation instruction that includes an address of a vector.

At block 504, the example method 500 may include receiving, by a computation module, the vector that includes one or more elements based on the address of the vector included in the vector bitwise operation instruction. For example, the computation module 110 may receive a vector that includes one or more elements. For example, the vector caching unit 112 may be configured to store a vector that may include one or more elements respectively denoted as A(1), A(2), . . . A(n).

At block 506, the example 500 may include performing, by one or more bitwise processors of the computation module, bitwise operations to the one or more elements to generate an output result. For example, in response to a VAND instruction, the one or more bitwise processors 310 may be configured to perform a bitwise AND operation for all the elements in a single vector to generate an output result, e.g., A(1) AND A(2) AND A(3) . . . AND A(n). In other words, the output result is a value of 1 only when all the elements in the vector are 1.

In response to a VOR instruction, the one or more bitwise processors 310 may be configured to perform a bitwise OR operation for all the elements in the vector to generate an output result e.g., A(1) OR A(2) OR A(3) . . . OR A(n). In other words, the output result is a value of 1 when at least one of the elements in the vectors is 1.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for vector operations in a neural network, comprising:
    four registers configured to respectively store a first starting address of a first vector, a second starting address of a second vector, a count of bits of the first vector that indicates a size of the first vector relative to the first starting address, and a count of bits of the second vector that indicates a size of the second vector relative to the second starting address;
    a controller unit configured to receive a vector bitwise operation instruction that includes four register IDs that respectively identify the four registers; and
    a computation module configured to receive the first vector and the second vector based on the first starting address and the second starting address in response to the vector bitwise operation instruction, wherein the first vector includes one or more first elements and the second vector includes one or more second elements, and wherein the computation module includes:
        one or more bitwise processors configured to perform bitwise operations between each of the first elements and a corresponding one of the second elements to generate one or more operation results, and
        a combiner configured to combine the one or more operation results into an output vector.

2. The apparatus of claim 1, further comprising a direct memory access unit configured to retrieve the first vector and the second vector from a storage device based on the starting address of the first vector, the size of the first vector, the starting address of the second vector, and the size of the second vector.

3. The apparatus of claim 1, wherein the one or more bitwise processors are configured to perform a logical AND operation between each of the first elements and a corresponding one of the second elements to generate the one or more operation results when the vector bitwise operation instruction includes an operation code that indicates an AND operation between the first vector and the second vector.

4. The apparatus of claim 1, wherein the one or more bitwise processors are configured to perform a logical OR operation between each of the first elements and a corresponding one of the second elements to generate the one or more operation results when the vector bitwise operation instruction includes an operation code that indicates an OR operation between the first vector and the second vector.

5. An apparatus for vector operations in a neural network, comprising:
    two registers configured to respectively store a starting address of a vector and a count of bits of the vector that indicates a size of the vector relative to the starting address;
    a controller unit configured to receive a vector bitwise operation instruction that includes two register IDs that respectively identify the two registers;
    a computation module configured to receive the vector that includes one or more elements based on the starting address of the vector included in the vector bitwise operation instruction, wherein the computation module includes one or more bitwise processors configured to perform bitwise operations to the one or more elements to generate an output result.

6. The apparatus of claim 5, further comprising a direct memory access unit configured to retrieve the vector from a storage device based on the starting address of the vector and the size of the vector.

7. The apparatus of claim 5, wherein the one or more bitwise processors are configured to perform a logical AND operation to the one or more elements in the vector to generate the output result when the vector bitwise operation instruction includes an operation code that indicates an AND operation between the elements of the vector.

8. The apparatus of claim 5, wherein the one or more bitwise processors are configured to perform a logical OR operation to the one or more elements in the vector to generate the output result when the vector bitwise operation instruction includes an operation code that indicates an OR operation between the elements of the vector.

9. A method for vector operations in a neural network, comprising:

respectively storing, by four registers, a first starting address of the first vector, a second starting address of the second vector, a count of bits of a first vector that indicates a size of the first vector relative to the first starting address and a count of bits of a second vector that indicates a size of the second vector relative to the first starting address;

receiving, by a controller unit, a vector bitwise operation instruction that includes four register IDs that identify the four registers;

receiving, by a computation module, the first vector and the second vector based on the first starting address and the second starting address in response to the vector bitwise operation instruction, wherein the first vector includes one or more first elements and the second vector includes one or more second elements;

performing, by one or more bitwise processors of the computation module, bitwise operations between each of the first elements and a corresponding one of the second elements to generate one or more operation results; and combining, by a combiner of the computation module, the one or more operation results into an output vector.

10. The method of claim 9, further comprising retrieving, by a direct memory access unit, the first vector and the second vector from a storage device based on the starting address of the first vector, the size of the first vector, the starting address of the second vector, and the size of the second vector.

11. The method of claim 9, further comprising performing, by the one or more bitwise processors, a logical AND operation between each of the first elements and a corresponding one of the second elements to generate the one or more operation results when the vector bitwise operation instruction includes an operation code that indicates an AND operation between the first vector and the second vector.

12. The method of claim 9, further comprising performing, by the one or more bitwise processors, a logical OR operation between each of the first elements and a corresponding one of the second elements to generate the one or more operation results when the vector bitwise operation instruction includes an operation code that indicates an OR operation between the first vector and the second vector.

13. A method for vector operations in a neural network, comprising:

respectively storing, by two registers, a starting address of a vector and a count of bits of the vector that indicates a size of the vector relative to the starting address;

receiving, by a controller unit, a vector bitwise operation instruction that includes two register IDs that respectively identify the two registers;

receiving, by a computation module, the vector that includes one or more elements based on the starting address of the vector included in the vector bitwise operation instruction; and performing, by one or more bitwise processors of the computation module, bitwise operations to the one or more elements to generate an output result.

14. The method of claim 13, further comprising retrieving, by a direct memory access unit, the vector from a storage device based on the starting address of the vector and the size of the vector.

15. The method of claim 13, wherein the performing bitwise operations further comprises performing, by the one or more bitwise processors, a logical AND operation to the one or more elements in the vector to generate the output result when the vector bitwise operation instruction includes an operation code that indicates an AND operation between the elements of the vector.

16. The method of claim 13, wherein the performing bitwise operations further comprises performing, by the one or more bitwise processors, a logical OR operation to the one or more elements in the vector to generate the output result when the vector bitwise operation instruction includes an operation code that indicates an OR operation between the elements of the vector.

* * * * *